United States Patent
Miyata et al.

(10) Patent No.: US 11,872,872 B2
(45) Date of Patent: Jan. 16, 2024

(54) AUTOMOTIVE DOOR SEALING MEMBER

(71) Applicant: Nishikawa Rubber Co., Ltd., Hiroshima (JP)

(72) Inventors: Tomonori Miyata, Hiroshima (JP); Yasuhiro Morihara, Hiroshima (JP)

(73) Assignee: Nishikawa Rubber Co., Ltd., Hiroshima (JP)

( * ) Notice: Subject to any disclaimer, the term of this patent is extended or adjusted under 35 U.S.C. 154(b) by 392 days.

(21) Appl. No.: 17/307,105

(22) Filed: May 4, 2021

(65) Prior Publication Data

US 2021/0354538 A1    Nov. 18, 2021

(30) Foreign Application Priority Data

May 14, 2020   (JP) .................................. 2020-085050

(51) Int. Cl.
| | | |
|---|---|---|
| *B60J 10/36* | (2016.01) | |
| *B60J 10/86* | (2016.01) | |
| *B60J 10/27* | (2016.01) | |
| *B60J 10/18* | (2016.01) | |

(52) U.S. Cl.
CPC .............. *B60J 10/86* (2016.02); *B60J 10/18* (2016.02); *B60J 10/27* (2016.02); *B60J 10/36* (2016.02)

(58) Field of Classification Search
CPC ... B60J 10/86; B60J 10/18; B60J 10/27; B60J 10/36; B60J 10/16; B60J 10/265; B60J 10/88; B60J 10/76; B60J 10/20
See application file for complete search history.

(56) References Cited

U.S. PATENT DOCUMENTS

| | | | | |
|---|---|---|---|---|
| 10,112,468 B2 * | 10/2018 | Miyata | ...................... | B60J 10/16 |
| 10,220,691 B2 * | 3/2019 | Masumoto | ............. | B60J 10/233 |
| 10,220,692 B2 * | 3/2019 | Mori | ......................... | B60J 10/88 |
| 10,406,902 B2 * | 9/2019 | Masumoto | ............... | B60J 10/50 |

(Continued)

FOREIGN PATENT DOCUMENTS

| | | | | |
|---|---|---|---|---|
| FR | 2912348 A1 * | 8/2008 | .............. | B60J 10/17 |
| FR | 2912348 A1 | 8/2008 | | |

(Continued)

*Primary Examiner* — Amy R Weisberg
*Assistant Examiner* — Sara Laghlam
(74) *Attorney, Agent, or Firm* — Renner, Otto, Boisselle & Sklar, LLP

(57) ABSTRACT

An object of the present disclosure is to generate a click feeling, and thus improve workability, in attaching a trim strip member to a sealing member, and to increase a retaining force retaining the trim strip member to the sealing member after the attachment, without an increase in the number of components and the number of assembling steps. A trim strip member 40 includes an upper engagement portion 42 and a lower engagement portion 43 at an upper portion and a lower portion of the trim strip member, respectively. A side of a sealing member body 21 facing outside of a passenger compartment includes a portion made of a rigid material that is harder than an elastic material, and is provided with an upper protrusion 25a and a lower protrusion 25b spaced apart from each other in a vertical direction, the upper protrusion 25a and the lower protrusion 25b respectively engaging with the upper engagement portion 42 and the lower engagement portion 43 of the trim strip member 40.

2 Claims, 5 Drawing Sheets

(56) References Cited

U.S. PATENT DOCUMENTS

| | | | |
|---|---|---|---|
| 10,583,726 B2* | 3/2020 | Nishikawa | B60J 10/265 |
| 10,625,587 B2* | 4/2020 | Suesada | B60J 10/88 |
| 2018/0290526 A1 | 10/2018 | Nishikawa | |
| 2018/0313139 A1* | 11/2018 | Nishikawa | B60J 10/76 |
| 2019/0118732 A1* | 4/2019 | Tomoyasu | B60J 10/265 |
| 2019/0193542 A1* | 6/2019 | Prodoni | B60J 10/76 |

FOREIGN PATENT DOCUMENTS

| | | |
|---|---|---|
| JP | 2011-132968 | 7/2011 |
| JP | 2018-176951 A | 11/2018 |

* cited by examiner

INSIDE OF PASSENGER COMPARTMENT ← → OUTSIDE OF PASSENGER COMPARTMENT

AUTOMOTIVE DOOR SEALING MEMBER

CROSS-REFERENCE TO RELATED APPLICATION

This application claims priority to Japanese Patent Application No. 2020-085050 filed on May 14, 2020, the entire disclosure of which is incorporated by reference herein.

BACKGROUND

The present disclosure relates to an automotive door sealing member to be attached to a door of an automobile.

A sealing member has been typically attached to a door of an automobile. Sometimes a decorative trim strip member has been additionally attached. The sealing member disclosed in French Patent Application Publication No. 2912348 is attached to an upper portion of a window frame from outside of a passenger compartment. On a side facing the outside of the passenger compartment, the sealing member is provided with an upper protrusion and a lower protrusion for attaching a decorative trim strip member. An upper portion of the decorative trim strip member engages with the upper protrusion, and a lower portion of the decorative trim strip member engages with the lower protrusion, thereby attaching the decorative trim strip member to the sealing member.

Further, in Japanese Unexamined Patent Publication No. 2011-132968, a sealing member is attached so as to sandwich a flange portion formed at an upper edge of a door panel, and a lip portion that is in contact with glass is provided on a side of the sealing member facing inside of the passenger compartment. A clip made of synthetic resin such as polyacetal resin is attached to the flange portion. The clip is provided with a recessed groove in a lower portion on the outside of the passenger compartment, and has an engagement surface on an upper portion of the clip. In attaching the decorative trim strip member, a lower portion of the decorative trim strip member is engaged in the recessed groove of the clip. Using this engaged portion as a rotation fulcrum, the decorative trim strip member is entirely rotated so that an upper portion of the decorative trim strip member engages with the engagement surface of the clip.

SUMMARY

A sealing member attached to the upper portion of the window frame, such as the sealing member in French Patent Application Publication No. 2912348, has a gently curved shape as viewed from the side, so as to correspond to a shape of the upper portion of the window frame. In attaching the sealing member to the upper portion of the window frame, the sealing member is attached from the outside of the passenger compartment while being bent so as to match the shape of the upper portion of the window frame. The decorative trim strip member is attached in a similar manner.

In French Patent Application Publication No. 2912348, the upper portion and the lower portion of the decorative trim strip member are respectively engaged with the upper protrusion and the lower protrusion that are provided on the side of the sealing member facing the outside of the passenger compartment. However, both the upper protrusion and the lower protrusion are made of an elastic material similar to the material of the lip, and are easily deformed. Thus, a retaining force for the decorative trim strip member is weak, which may cause the decorative trim strip member to fall off. Further, the upper protrusion and the lower protrusion of the sealing member are elastically deformed in attaching the decorative trim strip member to the sealing member. Since this deformation occurs slowly, there are no sound, vibration, or the like generated when the attachment is completed. That is, there is no so-called click feeling. For this reason, a worker has not been able to recognize the completion of attachment by sound or vibration. Therefore, there has still been room for improvement in terms of workability.

On the other hand, in Japanese Unexamined Patent Publication No. 2011-132968, the clip is made of rigid resin. Thus, it is considered that the retaining force for the decorative trim strip member has increased and the click feeling at the time of completion of the attachment has been obtained. However, in Japanese Unexamined Patent Publication No. 2011-132968, a plurality of clips to attach the decorative trim strip member, and a step of attaching the clips to the door panel are necessary. This has resulted in an increase in the number of components and the number of assembling steps.

In view of the foregoing, it is an object of the present disclosure to generate a click feeling, and thus improve workability, in attaching a trim strip member to a sealing member, and to increase a retaining force retaining the trim strip member to the sealing member after the attachment, without an increase in the number of components and the number of assembling steps.

In order to achieve the above object, a first aspect of the present disclosure is directed to an automotive door sealing member that is attached, from outside of a passenger compartment, to a window frame extending so as to define a window opening of an automotive door, and seals a gap between the window frame and window glass. The automotive door sealing member includes: a sealing member body made of an elastic material and having an insertion groove into which a sealing member mounting planar portion is inserted, the sealing member mounting planar portion being formed in an upper frame portion of the window frame and extending toward the outside of the passenger compartment; and a trim strip member configured to be attached to a side of the sealing member body facing the outside of the passenger compartment. The trim strip member includes an upper engagement portion and a lower engagement portion at an upper portion and a lower portion of the trim strip member, respectively, and the side of the sealing member body facing the outside of the passenger compartment includes a portion made of a rigid material that is harder than the elastic material, and is provided with an upper protrusion and a lower protrusion spaced apart from each other in a vertical direction, the upper protrusion and the lower protrusion respectively engaging with the upper engagement portion and the lower engagement portion of the trim strip member.

According to this configuration, if the upper frame portion of the window frame has a gently curved shape, for example, the sealing member body can be curved along the curved shape and attached to the sealing member mounting planar portion, since the sealing member body is a member made of an elastic material. In the attachment of the trim strip member, for example, the lower engagement portion of the trim strip member is engaged with the lower protrusion of the sealing member body, and then the trim strip member is rotated about the vicinity of the lower engagement portion as a fulcrum; thereafter, the upper engagement portion of the trim strip member is engaged with the upper protrusion of the sealing member body, thereby making it possible to attach the trim strip member to the sealing member body.

Since the upper protrusion of the sealing member body is made of a rigid material, sound and vibration are easily generated at the moment of engagement and a click feeling is obtained. Thus, the worker can determine that the attachment has been completed, which improves workability. In addition, a separate member such as a clip is not required. This prevents an increase in the number of components and the number of assembling steps.

Note that in the attachment of the trim strip member, the upper engagement portion of the trim strip member may be engaged with the upper protrusion of the sealing member body and after that, the trim strip member may be rotated about the vicinity of the upper engagement portion as a fulcrum. Then, the lower engagement portion of the trim strip member may be engaged with the lower protrusion of the sealing member body.

According to a second aspect of the present disclosure, the sealing member body includes an upper wall portion extending along an upper surface of the sealing member mounting planar portion, a lower wall portion extending along a lower surface of the sealing member mounting planar portion, and an outer wall portion coupling an end of the upper wall portion closer to the outside of the passenger compartment and an end of the lower wall portion closer to the outside of the passenger compartment. A core made of a rigid material harder than the elastic material is embedded in the upper wall portion, the lower wall portion and the outer wall portion. The upper protrusion and the lower protrusion are formed integrally with the elastic material so as to protrude from the elastic material.

According to this configuration, in the state in which the sealing member body is attached to the sealing member mounting planar portion, the sealing member mounting planar portion is sandwiched between the upper wall portion and the lower wall portion in the vertical direction. The sealing member body is firmly fixed to the sealing member mounting planar portion since the core is embedded in the sealing member body.

According to a third aspect of the present disclosure, the outer wall portion extends downward and below the lower wall portion, the lower protrusion is provided at a position of the outer wall portion lower than the lower wall portion, and a side of the outer wall portion facing the outside of the passenger compartment and positioned below the lower wall portion is provided with a reinforcing plate made of a rigid material harder than the elastic material.

If the outer wall portion made of an elastic material extends downward and below the lower wall portion, the portion of the outer wall portion positioned below the lower wall portion is elastically deformed easily. In such a configuration, when a force acts on the trim strip member in a detachment direction, there is a risk that the lower protrusion is displaced and easily detached from the trim strip member. In the present disclosure, the reinforcing plate made of a rigid material is provided in the portion of the outer wall portion that is easily elastically deformed. The reinforcing plate is capable of reducing the displacement of the lower protrusion, and the trim strip member is less likely to be detached.

According to a fourth aspect of the present disclosure, a lower portion of the reinforcing plate is continuous with a base of the lower protrusion.

According to this configuration, the reinforcing effect of the reinforcing plate may be enhanced by making the reinforcing plate and the lower protrusion continuous with each other. The reinforcing plate and the lower protrusion may be formed integrally.

According to a fifth aspect of the present disclosure, the lower protrusion protrudes downward, a portion of the lower protrusion closer to the outside of the passenger compartment is a rigid portion made of the rigid material, a portion of the lower protrusion closer to inside of the passenger compartment is a flexible portion made of the elastic material, and the lower engagement portion of the trim strip member bends toward the inside of the passenger compartment so as to make contact with the flexible portion.

According to this configuration, the lower engagement portion of the trim strip member can be brought into contact with the flexible portion of the lower protrusion of the sealing member body, with the trim strip member attached to the sealing member body. Thus, wobbling of the trim strip member and slipping thereof in the front-rear direction of the vehicle are reduced. Thus, misalignment of the trim strip member is less likely to occur.

According to the sixth aspect of the present disclosure, the upper protrusion protrudes upward, and the upper engagement portion of the trim strip member curves toward the inside of the passenger compartment and bends downward.

According to this configuration, in the attachment of the trim strip member, the trim strip member is rotated about the vicinity of the lower engagement portion as a fulcrum, with the lower engagement portion engaged with the lower protrusion; thereafter, the upper engagement portion of the trim strip member is engaged with the upper protrusion of the sealing member body, thereby making it possible to attach the trim strip member to the sealing member body. In other words, the lower protrusion having the flexible portion may be difficult to generate a click feeling at the time of the attachment of the trim strip member; however, according to the present disclosure, the trim strip member is engaged with the lower protrusion first, and in engaging the trim strip member with the upper protrusion thereafter, the click feeling is easily generated due to the upper engagement portion that curves toward the inside of the passenger compartment and bends downward.

According to the present disclosure, a sealing member body made of an elastic material is provided with an upper protrusion and a lower protrusion, each made of a rigid material, at a side facing the outside of the passenger compartment, and the upper protrusion and the lower protrusion engage with an upper engagement portion and a lower engagement portion of a trim strip member, respectively. It is therefore possible to generate a click feeling, and thus improve workability, in attaching the trim strip member to the sealing member, and to increase a retaining force retaining the trim strip member to the sealing member after the attachment, without an increase in the number of components and the number of assembling steps.

DETAILED DESCRIPTION

An embodiment of the present disclosure will now be described in detail with reference to the drawings. Note that the description of the following preferred embodiment is only an example in nature, and is not intended to limit the scope, application or uses of the present disclosure.

Figure 1:
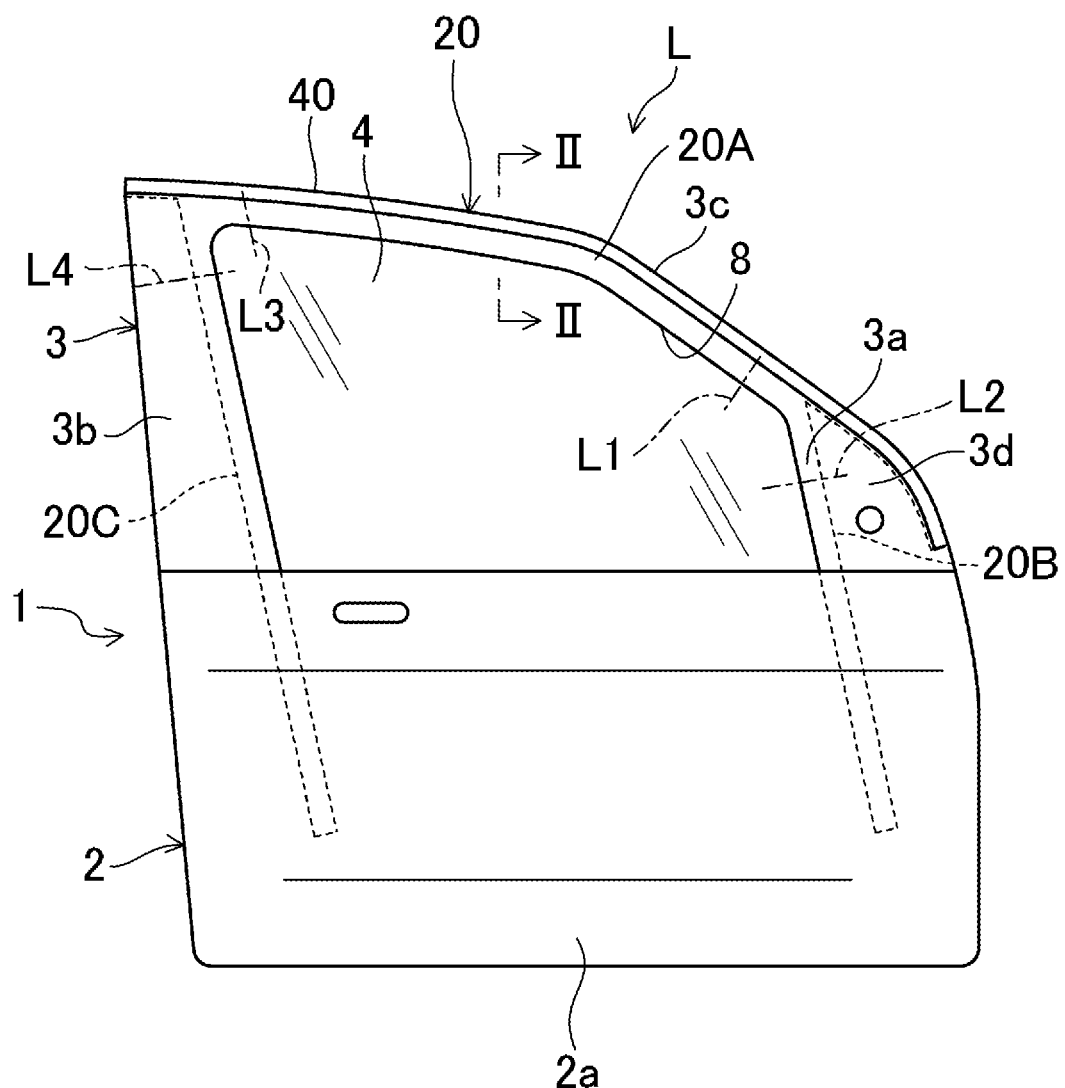
FIG. 1 illustrates an automotive door including an automotive door sealing member according to an embodiment, as viewed from outside of a passenger compartment.

FIG. 1 is a side view illustrating an automotive door 1 including an automotive door sealing member 20 according to an embodiment of the present disclosure, as viewed from outside of a passenger compartment. This automotive door 1 is a front door to be provided at the front on each side of an automobile (not shown), and uncovers and covers an opening (not shown) at the front on the side of the automobile. Although not shown, if a rear door is arranged on each side of the automobile, the present disclosure is also applicable to a sealing member attached to the rear door.

In the following description of the embodiment, front and rear sides of the automobile will be simply referred to as the "front" and the "rear," respectively.

The automotive door 1 includes a door body 2 constituting substantially the lower half of the automotive door 1, and a window frame 3 constituting substantially the upper half thereof. The door body 2 includes an inner panel (not shown) and an outer panel 2a, which are made from steel plates, for example.

Figure 2:
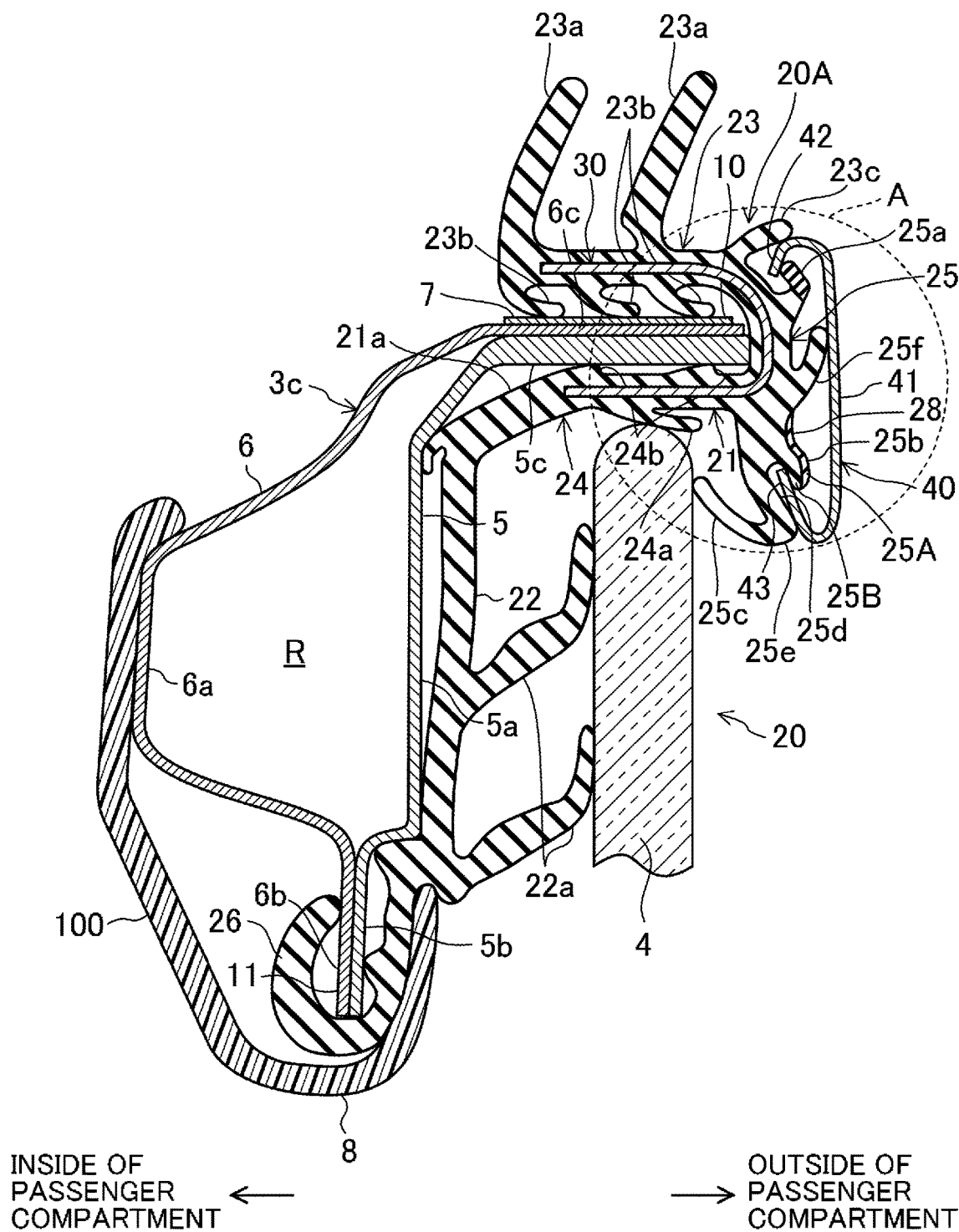
FIG. 2 is a cross-sectional view taken along the line II-II in FIG. 1.

As illustrated in FIG. 2, the window frame 3 includes a sealing member mounting planar portion 10 protruding toward the outside of the passenger compartment and an inner peripheral flange 11 protruding toward the center of a window opening 8 (illustrated in FIG. 1).

(Configuration of Sealing Member)

A sealing member 20 is a so-called "hiding type" glass run that covers and hides a portion of the window frame 3 at least from the outside of the passenger compartment. As will be described in detail later, the sealing member 20 is attached to the window frame 3 from the outside of the passenger compartment and functions as a member that seals a gap between the window frame 3 and a window glass 4. The sealing member 20 is formed so as to cover an outer surface of the sealing member mounting planar portion 10, which is an outer surface of the window frame 3, and the inner peripheral flange 11.

As shown in FIG. 2, the sealing member 20 includes a sealing member body 21 assembled to the sealing member mounting planar portion 10 of the window frame 3, an inner side wall 22 molded integrally with the sealing member body 21, a core 30, and a trim strip member 40 assembled to a portion of the sealing member body 21 outside of the passenger compartment. The core 30 and the sealing member body 21 are made of different materials. Specifically, the core 30 may be made of a rigid material, such as hard resin (e.g., resin containing talc or glass fibers mixed therein), an aluminum alloy, a steel material, and stainless steel, which is harder than an elastic material constituting the sealing member body 21. On the other hand, examples of the material constituting the sealing member body 21 include a flexible material (elastic material) such as ethylene-propylene-diene rubber (EPDM) and thermoplastic elastomer olefin (TPO), which is softer than the core 30 and elastic. The inner side wall 22 may be made of EPDM or TPO, for example. The EPDM or TPO may be a foamed material, or a solid material.

The sealing member 20 is comprised of a combination of an extrusion-molded portion and a die-formed portion that is formed using a molding die. As shown in FIG. 1, a portion around the boundary between an upper sealing member 20A and a front vertical sealing member 20B of the sealing member 20, i.e., a portion between boundary lines L1 and L2 (dash-dot lines), is a die-formed portion. Further, a portion around the boundary between the upper sealing member 20A and a rear vertical sealing member 20C of the sealing member 20, i.e., a portion between boundary lines L3 and L4 (dash-dot lines), is a die-formed portion. The other portions of the sealing member 20 are extrusion-molded.

As shown in FIG. 2, an insertion groove 21a into which the sealing member mounting planar portion 10 of the window frame 3 is inserted is formed in the sealing member body 21 so as to be open toward the inside of the passenger compartment. This insertion groove 21a extends long in the direction in which the sealing member mounting planar portion 10 extends.

The sealing member body 21 includes: an upper wall portion 23 extending in the front-rear direction along the upper surface of the sealing member mounting planar portion 10 of the window frame 3; a lower wall portion 24 extending in the front-rear direction along the lower surface of the sealing member mounting planar portion 10 of the window frame 3; and an outer wall portion 25 coupling the end of the upper wall portion 23 closer to the outside of the passenger compartment and the end of the lower wall portion 24 closer to the outside of the passenger compartment. The outer wall portion 25 extends in the vertical direction and constitutes a portion of the sealing member body 21 facing the outside of the passenger compartment. The outer wall portion 25 extends downward and below the lower wall portion 24. The core 30 is not embedded in a portion of the outer wall portion 25 below the lower wall portion 24, which allows the portion to be more easily deformed elastically as compared to the portion in which the core material 30 is embedded. The outer wall portion 25 is covered with the trim strip member 40, described later, on the side facing the outside of the passenger compartment. The insertion groove 21a is an opening between the end of the upper wall portion 23 closer to the inside of the passenger compartment and the end of the lower wall portion 24 closer to the inside of the passenger compartment.

The upper surface of the upper wall portion 23 of the sealing member body 21 is provided with two upper sealing lips 23a and 23a extending upward. The upper sealing lips 23a and 23a make contact with a vehicle body panel (not shown) when the door 1 is closed. The upper surface of the upper wall portion 23 is provided with an outer protrusion 23c, protruding outward and extending in the front-rear direction, at a position closer to the outside of the passenger compartment than the upper sealing lips 23a. The outer protrusion 23c is in contact with the upper portion of the trim strip member 40 from above.

The lower surface of the upper wall portion 23 of the sealing member body 21 is an inner surface of the insertion groove 21a. The lower surface of the upper wall portion 23 is provided with lower sealing lips 23b, 23b, and 23b protruding downward. The lower sealing lips 23b, 23b, and 23b are in contact with the upper surface of the sealing member mounting planar portion 10, i.e., the upper surface of a third planar portion 7.

The lower surface of the lower wall portion 24 of the sealing member body 21 is provided with a lower protruding piece 24a. The lower protruding piece 24a is in contact with the upper edge of the closed window glass 4. The upper surface of the lower wall portion 24 is also the inner surface of the insertion groove 21a. The upper surface of the lower wall portion 24 is provided with a raised portion 24b. The raised portion 24b is formed to be smaller than the lower sealing lip 23b, and is in contact with the lower surface of the sealing member mounting planar portion 10, i.e., the lower surface of an outer planar portion 5c of the first planar portion 5. Since the raised portion 24b is smaller than the lower sealing lip 23b, the sealing member mounting planar portion 10 is disposed below a vertical middle portion in the insertion groove 21a.

As shown in FIG. 2, the inner side wall 22 is continuous with the portion of the lower wall portion 24 closer to the inside of the passenger compartment. The inner side wall 22 extends downward to the inner peripheral flange 11 of the window frame 3, and then toward the inside of the passenger compartment and is bent upward to form an inner decorative lip 26 and engage with the inner peripheral flange 11. The reference character 100 in FIG. 2 denotes a trim member.

The inner side wall 22 is provided with inner sealing lips 22a and 22a. The inner sealing lips 22a and 22a are in contact with the surface of the window glass 4 facing the inside of the passenger compartment.

An upper portion of the outer wall portion 25 of the sealing member body 21 is provided with an upper protrusion 25a. The upper protrusion 25a protrudes toward the outside of the passenger compartment and bends upward and toward the inside of the passenger compartment, just like a hook. The upper protrusion 25a is continuous in the front-rear direction. The distal end of this upper protrusion 25a is adjacent to the tip end of the outer protrusion 23c.

The upper protrusion 25a is made of a rigid material harder than an elastic material constituting the outer wall portion 25. Specifically, the upper protrusion 25a may be made of a material similar to the material of the core 30. The upper protrusion 25a is integrally molded with the outer wall portion 25. For example, the sealing member body 21 can be extrusion-molded together with the core 30. At the time of the extrusion-molding, the upper protrusion 25a can be molded simultaneously with the sealing member body 21 by supplying a rigid material to become the upper protrusion 25a to the upper side of the outer wall portion 25. The upper protrusion 25a and the sealing member body 21 may be formed in separate steps.

Since the upper protrusion 25a is made of a rigid material, the upper protrusion 25a itself hardly deforms when an external force acts on upper protrusion 25a. However, since the base end of the upper protrusion 25a is integral with the outer wall portion 25 made of an elastic material, an external force that acts on the upper protrusion 25a elastically deforms the outer wall portion 25 in the vicinity of the base end of the upper protrusion 25a, which allows the upper protrusion 25a to be displaced. However, since the core 30 is embedded in the outer wall portion 25, the degree of deformation of the upper protrusion 25a is small, and the risk of the later-described falling off of trim strip member 40 may be reduced.

The portion of the outer wall portion 25 of the sealing member body 21 below the lower wall portion 24 is provided with a lower protrusion 25b protruding downward. The lower protrusion 25b and the upper protrusion 25a are spaced apart from each other in the vertical direction. The lower protrusion 25b protrudes downward and below the lower wall portion 24 of the sealing member body 21 and the lower protruding piece 24a. A portion of the lower protrusion 25b closer to the outside of the passenger compartment is a rigid portion 25A made of a rigid material. The rigid portion 25A can be formed in a similar manner to the upper protrusion 25a.

A portion of the lower protrusion 25b closer to the inside of the passenger compartment is a flexible portion 25B formed of an elastic material. The rigid portion 25A extends in the vertical direction and can also be referred to as a covering portion that covers a portion of the flexible portion 25B facing the outside of the passenger compartment. Therefore, the lower protrusion 25b has a multilayer structure including the rigid portion 25A and the flexible portion 25B. The rigid portion 25A has a thickness (a dimension in the inward-outward direction) smaller than the dimension of the upper protrusion 25a in the same direction. Further, the thicknesses of the rigid portion 25A and the flexible portion 25B may be the same. Alternatively, the flexible portion 25B may be thicker or the rigid portion 25A may be thicker.

Since the lower protrusion 25b includes the rigid portion 25A, the lower protrusion 25b itself hardly deforms when an external force acts on it. However, similarly to the upper protrusion 25a, since the base end of the lower protrusion 25b is integral with the outer wall portion 25 made of an elastic material, an external force that acts on the lower protrusion 25b elastically deforms the outer wall portion 25 in the vicinity of the base end of the lower protrusion 25b, which allows the lower protrusion 25b to be displaced. Further, having the thinner rigid portion 25A than the upper protrusion 25a, the lower protrusion 25b itself may be slightly bent and deform. However, the degree of the displacement and deformation of the lower protrusion 25b is small due to having the rigid portion 25A and because the outer wall portion 25 includes the core 30 embedded therein, and the risk of the later-described falling off of the trim strip member 40 may be reduced.

The rigid portion 25A and the upper protrusion 25a may be made of the same material, or may be made of different materials. If the rigid portion 25A and the upper protrusion 25a are made of the same material, the hardness of the rigid portion 25A and the upper protrusion 25a may be substantially the same. If the rigid portion 25A and the upper protrusion 25a are made of different materials, the hardness of the rigid portion 25A and the hardness of the upper protrusion 25a may be different from each other. In this case, the rigid portion 25A may be harder or the upper protrusion 25a may be harder.

A portion of the outer wall portion 25 facing the outside of the passenger compartment and positioned below the lower wall portion 24 is provided with a reinforcing plate 28 made of a rigid material harder than the elastic material. The reinforcing plate 28 may be made of the same material as the rigid portion 25A, or may be made of a different material. The reinforcing plate 28 extends in the vertical direction and in the front-rear direction as well. A lower portion of the reinforcing plate 28 is continuous with a base portion of the rigid portion 25A constituting the lower protrusion 25b. An upper portion of the reinforcing plate 28 is positioned substantially at the same height as the lower wall portion 24. Therefore, the reinforcing plate 28 is stacked on and integral with the portion of the outer wall portion 25 positioned below the lower wall portion 24. Thus, the portion of the outer wall portion 25 positioned below the lower wall portion 24 is reinforced by the reinforcing plate 28, which reduces the deformation of the portion in the inward-outward direction. Since the lower portion of the outer wall portion 25 is less likely to be deformed toward the outside of the passenger compartment, the lower protrusion 25b is less likely to be displaced toward the outside of the passenger compartment. Thus, the reinforcing plate 28 may also be called a displacement reduction portion that reduces the displacement of the lower protrusion 25b toward the outside of the passenger compartment.

An outer sealing lip 25c protruding toward the inside of the passenger compartment is formed at a lower end of the outer wall portion 25 at a position closer to the inside of the passenger compartment than the lower protrusion 25b. The outer sealing lip 25c is in contact with the surface of the window glass 4 facing the outside of the passenger compartment. A lower end 25e of the outer sealing lip 25c is located below a lower end (protruding distal end) of the lower protrusion 25b.

A groove 25d is formed between the lower protrusion 25b and the outer sealing lip 25c. The groove 25d is open downward and extends in the front-rear direction.

The surface of the outer wall portion 25 of the sealing member body 21 facing the outside of the passenger compartment is provided with a pressing lip 25f protruding toward the outside of the passenger compartment and upward. This pressing lip 25f is in contact with a substantial vertical middle portion of the side of the trim strip member 40 facing the inside of the passenger compartment. An upper end of the reinforcing plate 28 is positioned in the vicinity of the base end portion of the pressing lip 25f.

Figure 3:
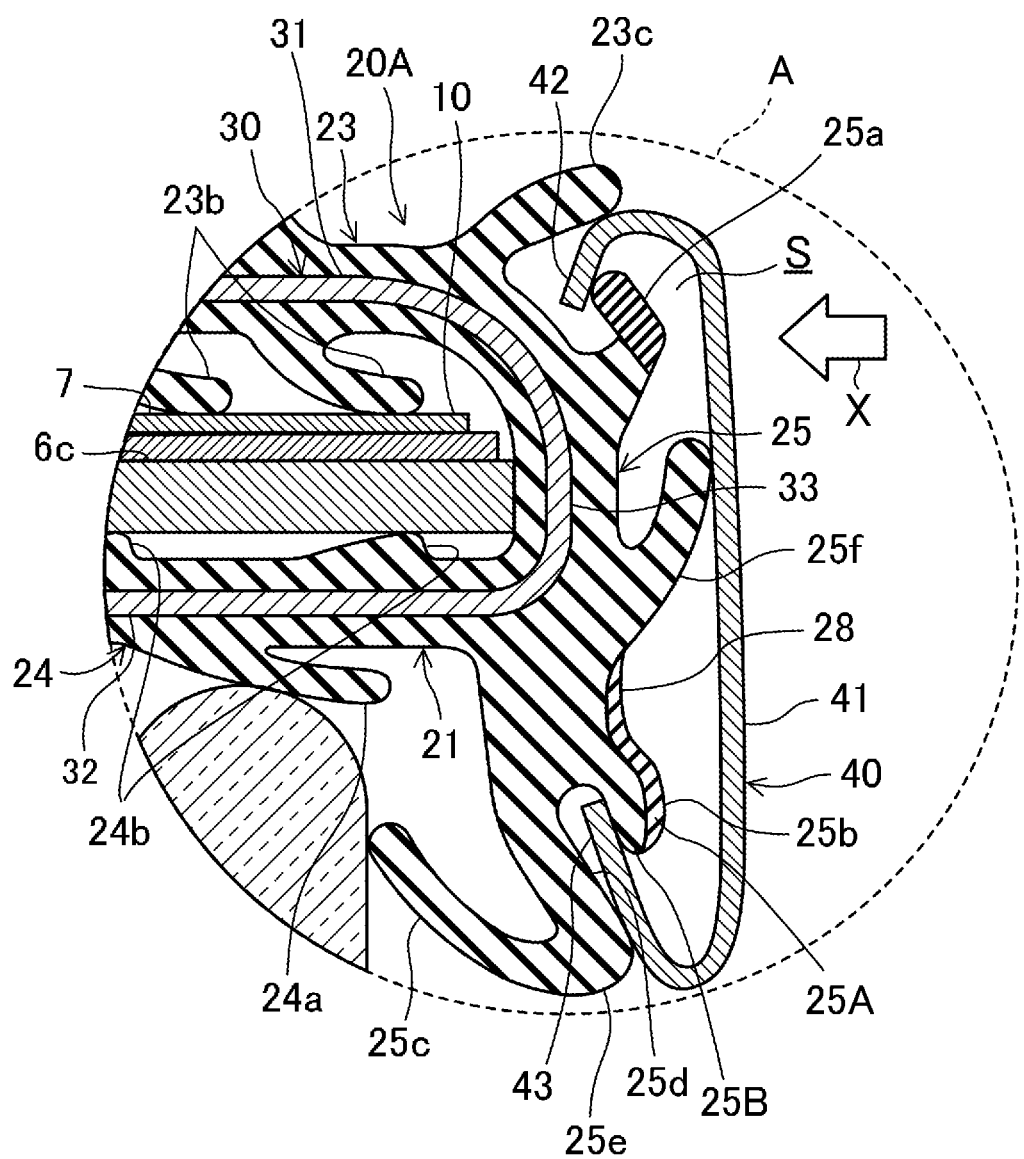
FIG. 3 is an enlarged view of the portion A in FIG. 2.

As shown in FIG. 3, the core 30 includes an upper planar portion 31, a lower planar portion 32, and an outer planar portion 33. The upper planar portion 31 extends along the upper surface of the sealing member mounting planar portion 10 (an upper surface of a third planar portion 7). The lower planar portion 32 extends along the lower surface of the sealing member mounting planar portion 10 (the outer planar portion 5c of a first planar portion 5). The outer planar portion 33 extends from an end of the upper planar portion 31 closer to the outside of the passenger compartment to an end of the lower planar portion 32 closer to the outside of the passenger compartment. The upper planar portion 31 of the core 30 is embedded in the upper wall portion 23 of the sealing member body 21. The lower planar portion 32 of the core 30 is embedded in the lower wall portion 24 of the sealing member body 21. The outer planar portion 33 of the core 30 is embedded in the outer wall portion 25 of the sealing member body 21.

The trim strip member 40 is a decorative member made of, for example, a metal or a rigid resin material coated with metal, and extends along the upper frame portion 3c of the window frame 3 in the front-rear direction. The vertical middle portion of the trim strip member 40 is a body 41 disposed so as to be exposed to the outside. In the trim strip member 40, an upper portion above the body 41 is provided with an upper engagement portion 42 that engages with the upper protrusion 25a of the sealing member body 21. The upper engagement portion 42 is implemented as a portion extending from the upper end of the body 41 toward the inside of the passenger compartment and bent downward. The upper engagement portion 42 is hooked on the upper protrusion 25a of the sealing member body 21 from above to engage with the upper protrusion 25a. In a state in which the upper engagement portion 42 is engaged with the upper protrusion 25a, the outer protrusion 23c is in contact with the upper surface of the upper engagement portion 42. Thus, no gap is formed between the upper end of the trim strip member 40 and the upper end of the sealing member body 21, which improves the appearance.

As shown in FIG. 2, in the trim strip member 40, a lower portion below the body 41 is provided with a lower engagement portion 43 that engages with the lower protrusion 25b of the sealing member body 21. The lower engagement portion 43 is implemented as a portion extending from the lower end of the body 41 toward the inside of the passenger compartment and bent upward. The lower engagement portion 43 is inserted from below into the groove 25d formed in the sealing member body 21 to engage with the lower protrusion 25b from inside of the passenger compartment.

In a state in which the lower engagement portion 43 is engaged with the lower protrusion 25b, the upper end (distal end) of the lower engagement portion 43 is in contact with the flexible portion 25B. In addition, a surface of the lower engagement portion 43 facing the inside of the passenger compartment is in contact with the lower end 25e of the outer sealing lip 25c from the outside of the passenger compartment. The upper end of the lower engagement portion 43 is in contact with the inner surface of the groove 25d as well.

The upper engagement portion 42 engages with the upper protrusion 25a, and the lower engagement portion 43 engages with the lower protrusion 25b, thereby making the trim strip member 40 attached to the sealing member body 21. In the state in which the trim strip member 40 is attached to the sealing member body 21, as shown in FIG. 3, the pressing lip 25f is in contact with the rear surface (the surface facing the inside of the passenger compartment) of the body 41 of the trim strip member 40, and applies a force outwardly pressing the body 41. This makes it difficult for the upper engagement portion 42 to be detached from the upper protrusion 25a, and for the lower engagement portion 43 to be detached from the lower protrusion 25b.

In the state in which the trim strip member 40 is attached to the sealing member body 21, there is a gap S between the distal end of the upper engagement portion 42 of the trim strip member 40 (corresponding to the upper portion of the trim strip member 40) and an upper part 21b of the side of the sealing member body 21 facing the outside of the passenger compartment. The gap S has a predetermined width or more and allows overstroke of the trim strip member 40 toward the inside of the passenger compartment (in the direction indicated by the hollow arrow X) in attaching the trim strip member 40 to the sealing member body 21.

Specifically, to engage the upper engagement portion 42 of the trim strip member 40 with the upper protrusion 25a, the upper engagement portion 42 is positioned outside of the upper protrusion 25a, and is then moved along the arrow X, so that the upper engagement portion 42 is pressed against the upper protrusion 25a and displaces the upper protrusion 25a toward the inside of the passenger compartment. At this moment, overstroke of the trim strip member 40 is necessary: the trim strip member 40 is pushed toward the inside of the passenger compartment across the attachment completion position (indicated by the solid line in FIG. 3). The overstroke achieves sufficient displacement of the upper protrusion 25a toward the inside of the passenger compartment. As a result, the upper engagement portion 42 of the trim strip member 40 is hooked on the upper protrusion 25a, and thereafter the trim strip member 40 moves back to the attachment completion position due to the resilience of the elastic material. The predetermined width of the gap S may be as wide as the width that allows the upper engagement portion 42 of the trim strip member 40 to be hooked on the upper protrusion 25a.

(Attachment of Sealing Member)

Figure 4:
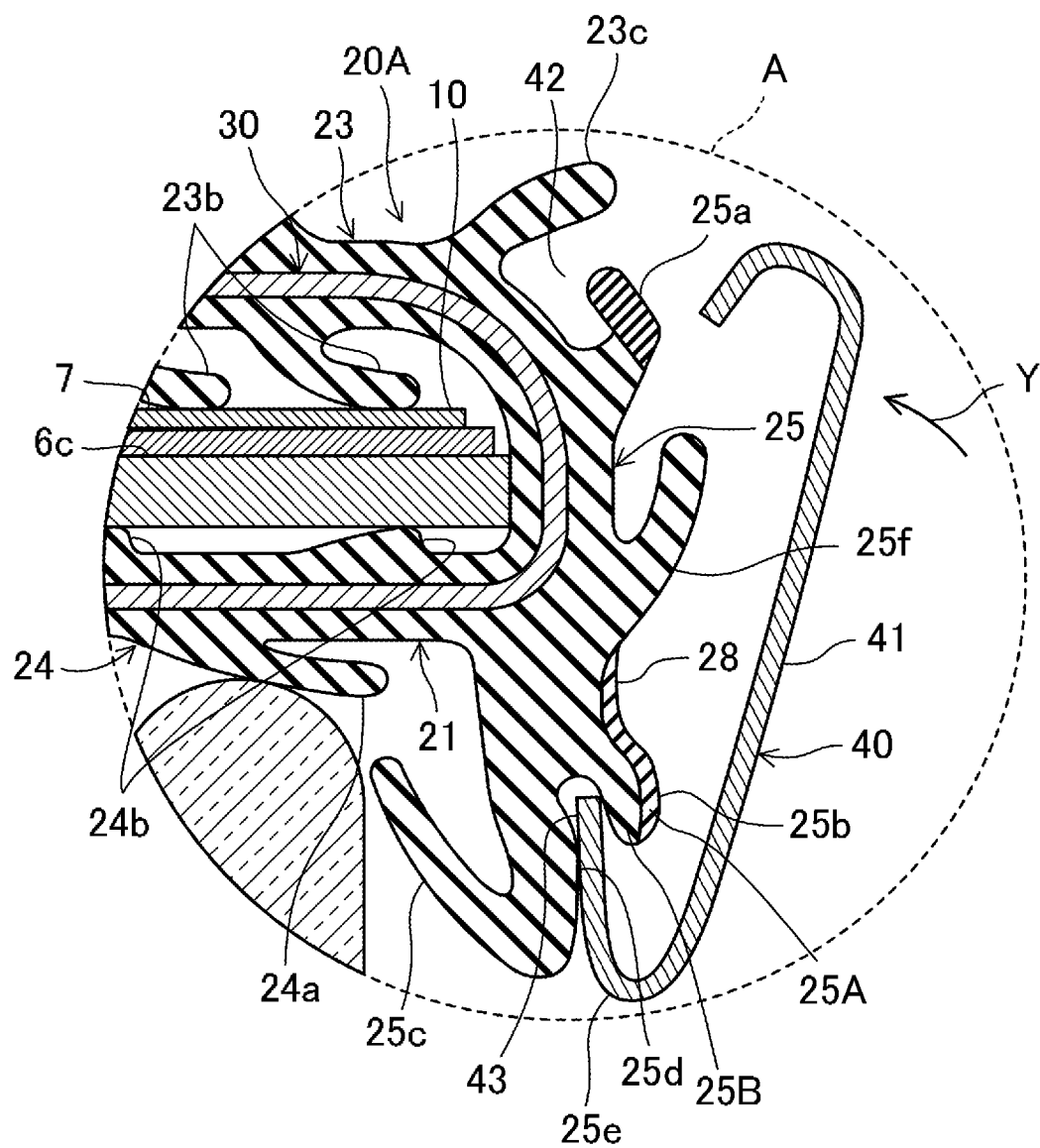
FIG. 4 is a view for explaining an attachment procedure of a trim strip member, and corresponds to FIG. 3.

Next, it will be described how to attach the sealing member 20 having the above configuration to the window frame 3 of the automotive door 1. First, it will be described how to attach the trim strip member 40 to the sealing member body 21. As shown in FIG. 4, in the attachment of the trim strip member 40, the lower engagement portion 43 of the trim strip member 40 is first hooked on the lower protrusion 25b of the sealing member body 21 and inserted into the groove 25d from below. At this time, the upper side of the trim strip member 40 may be positioned on the outside of the passenger compartment relative to the lower side.

Thereafter, as indicated by an arrow Y in FIG. 4, the trim strip member 40 is rotated about the vicinity of the lower engagement portion 43 as a fulcrum so that the upper side of the trim strip member 40 moves toward the inside of the passenger compartment. Then, while keeping the upper engagement portion 42 of the trim strip member 40 in contact with the side of the upper protrusion 25a closer to the outside of the passenger compartment, the trim strip member 40 is pressed in the direction indicated by the arrow X in FIG. 3. In this way, it is possible to displace the upper protrusion 25a toward the inside of the passenger compartment and cause overstroke of the upper engagement portion 42. The overstroke of the upper engagement portion 42 by a predetermined amount or more causes the upper protrusion 25a to pass over the upper engagement portion 42 and a quick movement of the upper protrusion 25a to a position closer to the outside of the passenger compartment than the upper engagement portion 42. At this moment, sound and vibration are generated. These sound and vibration generate a so-called "click feeling" that is obtained when the rigid upper protrusion 25a passes over the rigid upper engagement portion 42. After the upper engagement portion 42 of the trim strip member 40 is hooked on and engaged with the upper protrusion 25a, the external force is released, and the trim strip member 40 is attached at a normal position as indicated by the solid line in FIG. 3.

Note that in the attachment of the trim strip member 40, the upper engagement portion 42 of the trim strip member 40 may be engaged with the upper protrusion 25a of the sealing member body 21 and after that, the trim strip member 40 may be rotated about the vicinity of the upper engagement portion 42 as a fulcrum. Then, the lower engagement portion 43 of the trim strip member 40 may be engaged with the lower protrusion 25b of the sealing member body 21.

Next, it will be described how to attach the sealing member 20 to the window frame 3. The sealing member 20 is disposed outside of the window frame 3, and then, is moved toward the inside of the passenger compartment such that the sealing member mounting planar portion 10 of the window frame 3 is inserted into the insertion groove 21a of the sealing member 20.

The upper frame portion 3c of the window frame 3 is curved along the roof shape of the automobile as described above. However, it is actually difficult to form the sealing member body 21 (including the core 30) that coincides with the curved shape of the upper frame portion 3c. Thus, after linearly and integrally molded with each other, the sealing member body 21 and the core 30 are attached to the window frame 3 while being curved along the curved shape of the upper frame portion 3c.

In this embodiment, a boundary between the upper planar portion 31 and the outer planar portion 33 of the core 30 in the cross-section has a curved shape having a large curvature. Thus, the core 30 can be curved and deformed with a smaller force than a core having angular portions. Thus, the sealing member body 21 can be easily curved along the upper frame portion 3c when being attached to the upper frame portion 3c of the window frame 3.

When the sealing member mounting planar portion 10 is inserted into the insertion groove 21a of the sealing member 20, the upper surface of the sealing member mounting planar portion 10 makes contact with the lower sealing lips 23b, 23b, and 23b to ensure sealing properties between the sealing member mounting planar portion 10 and the sealing member body 21. When the sealing member mounting planar portion 10 is inserted into the insertion groove 21a of the sealing member 20 to be farthest in the depth direction, the position of the outer planar portion 5c of the first planar portion 5 of the sealing member mounting planar portion 10 is determined.

The trim strip member 40 may be attached to the window frame 3 of the automotive door 1 with the trim strip member 40 attached to the sealing member body 21 in advance, or the trim strip member 40 may be attached to the sealing member body 21 after the sealing member body 21 is attached to the window frame 3 of the automotive door 1.

Advantages of Embodiment

As described above, if the upper frame portion 3c of the window frame 3 has a gently curved shape, the sealing member body 21 may be curved along the curved shape and attached to the sealing member mounting planar portion 10, since the sealing member body 21 is a member made of an elastic material. In the attachment of the trim strip member 40, the trim strip member 40 may be rotated about the vicinity of the lower engagement portion 43 as a fulcrum, and thereafter, the upper engagement portion 42 of the trim strip member 40 is engaged with the upper protrusion 25a of the sealing member body 21, thereby making it possible to attach the trim strip member 40 to the sealing member body 21. Since the upper protrusion 25a of the sealing member body 21 is made of a rigid material, a click feeling is obtained at the time of engagement. Thus, the worker can determine that the attachment has been completed, which improves workability. In addition, a separate member such as a clip is not required to attach the trim strip member 40. This prevents an increase in the number of components and the number of assembling steps.

Further, even when an external force directed toward the outside of the passenger compartment (an external force in the detachment direction) acts on the trim strip member 40, the upper engagement portion 42 and the lower engagement portion 43 of the trim strip member 40 are less likely to be detached from the upper protrusion 25a and the lower protrusion 25b of the sealing member body 21, respectively, because the upper engagement portion 42 and the lower engagement portion 43 engage with the upper protrusion 25a and the lower protrusion 25b, each having a rigid portion. That is, since the upper engagement portion 42 and the lower engagement portion 43 of the trim strip member 40 are made of a rigid material, the deformation of the upper engagement portion 42 and the lower engagement portion 43 at the time when an external force acts in the detachment direction is reduced. Furthermore, since the upper protrusion 25a of the sealing member body 21 is comprised of a rigid material and the lower protrusion 25b includes the rigid portion 25A, the deformation of the upper protrusion 25a and the lower protrusion 25b at the time when an external force acts in the detachment direction is also reduced. Moreover, since the portion of the outer wall portion 25 positioned below the lower wall portion 24 is reinforced by the reinforcing plate 28, the deformation of the outer wall portion 25 toward the outside of the passenger compartment is reduced, and the lower protrusion 25b is less likely to be displaced toward the outside of the passenger compartment. As described above, the upper engagement portion 42 and the lower engagement portion 43 are less likely to detach from the upper protrusion 25a and the lower protrusion 25b, which reduces the risk of falling off of the trim strip member 40.

In addition, the lower engagement portion 43 of the trim strip member 40 can be brought into contact with the flexible portion 25B of the lower protrusion 25b of the sealing member body 21, with the trim strip member 40 attached to the sealing member body 21. Thus, wobbling of the trim strip member 40 and slipping thereof in the front-rear direction of the vehicle are reduced. Thus, misalignment of the trim strip member 40 is less likely to occur.

The embodiment described above is merely illustrative in every respect and shall not be construed in a limited manner. Any modification and change equivalent to the scope of claims fall within the scope of the present disclosure.

Figure 5:
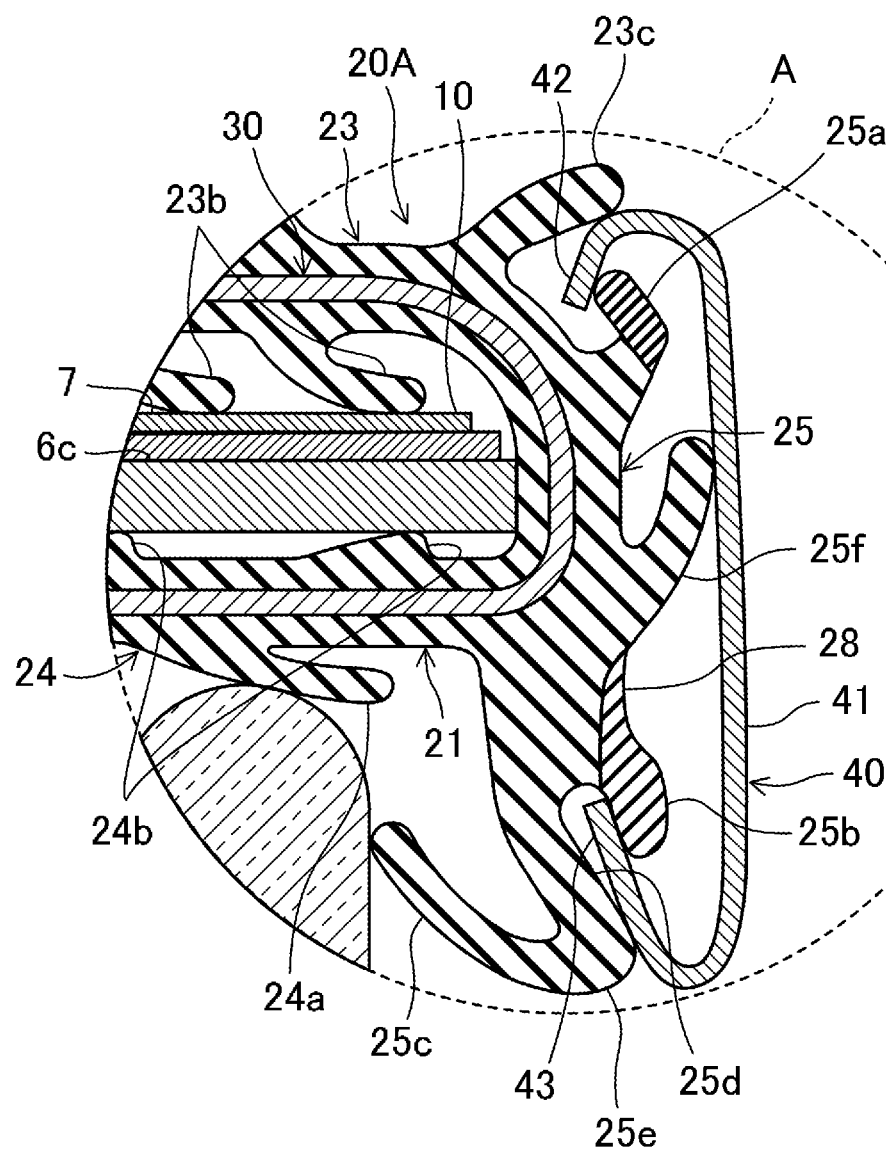
FIG. 5 is a view illustrating to a variation of the embodiment, and corresponds to FIG.

For example, as in a variation of the embodiment shown in FIG. 5, the lower protrusion 25b of the sealing member body 21 may be made of, for example, a rigid material only. In this case, the lower engagement portion 43 of the trim strip member 40 comes into contact with the rigid portion. Further, since the stiffness of the lower protrusion 25b is improved, the risk of falling off of the trim strip member 40 is further reduced.

As can be seen from the foregoing description, the automotive door sealing member according to the present disclosure can be attached to a window frame from outside of a passenger compartment.

What is claimed is:

1. An automotive door sealing member that is attached, from outside of a passenger compartment, to a window frame extending so as to define a window opening of an automotive door, and seals a gap between the window frame and window glass, the automotive door sealing member comprising:

a sealing member body made of an elastic material and having an insertion groove into which a sealing member mounting planar portion is inserted, the sealing member mounting planar portion being formed in an upper frame portion of the window frame and extending toward the outside of the passenger compartment; and a trim strip member configured to be attached to a side of the sealing member body facing the outside of the passenger compartment, wherein the trim strip member includes an upper engagement portion and a lower engagement portion at an upper portion and a lower portion of the trim strip member, respectively, and the side of the sealing member body facing the outside of the passenger compartment includes a portion made of a rigid material that is harder than the elastic material, and is provided with an upper protrusion and a lower protrusion spaced apart from each other in a vertical direction, the upper protrusion and the lower protrusion respectively engaging with the upper engagement portion and the lower engagement portion of the trim strip member, wherein the sealing member body includes an upper wall portion extending along an upper surface of the sealing member mounting planar portion, a lower wall portion extending along a lower surface of the sealing member mounting planar portion, and an outer wall portion coupling an end of the upper wall portion closer to the outside of the passenger compartment and an end of the lower wall portion closer to the outside of the passenger compartment, a core made of a rigid material harder than the elastic material is embedded in the upper wall portion, the lower wall portion and the outer wall portion, the upper protrusion and the lower protrusion are formed integrally with the elastic material so as to protrude from the elastic material, the outer wall portion extends downward and below the lower wall portion, the lower protrusion is provided at a position of the outer wall portion lower than the lower wall portion, a side of the outer wall portion facing the outside of the passenger compartment and positioned below the lower wall portion is provided with a reinforcing plate made of a rigid material harder than the elastic material, a lower portion of the reinforcing plate is continuous with a base of the lower protrusion, the lower protrusion protrudes downward, a portion of the lower protrusion closer to the outside of the passenger compartment is a rigid portion made of the rigid material, a portion of the lower protrusion closer to inside of the passenger compartment is a flexible portion made of the elastic material, and the lower engagement portion of the trim strip member bends toward the inside of the passenger compartment so as to make contact with the flexible portion.

2. The automotive door sealing member of claim 1, wherein the upper protrusion protrudes upward, and the upper engagement portion of the trim strip member curves toward the inside of the passenger compartment and bends downward.

* * * * *